(12) United States Patent (10) Patent No.: US 8,970,762 B2
Kim (45) Date of Patent: Mar. 3, 2015

(54) DIGITAL PHOTOGRAPHING APPARATUS AND METHOD OF CONTROLLING THE SAME

(75) Inventor: Jin-dong Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 830 days.

(21) Appl. No.: 12/956,163

(22) Filed: Nov. 30, 2010

(65) Prior Publication Data

US 2011/0134269 A1 Jun. 9, 2011

(30) Foreign Application Priority Data

Dec. 4, 2009 (KR) ........................ 10-2009-0119905

(51) Int. Cl.
*H04N 5/222* (2006.01)
*H04N 5/232* (2006.01)
*H04N 13/04* (2006.01)

(52) U.S. Cl.
CPC ....... *H04N 5/23293* (2013.01); *H04N 5/23219* (2013.01)
USPC ....................... 348/333.02; 348/52; 348/211.4

(58) Field of Classification Search
CPC ..................... H04N 5/23212; H04N 21/44008
USPC ............... 348/11.11–211.14, 211.18, 211.19, 348/333.01–333.12
See application file for complete search history.

(56) References Cited

U.S. PATENT DOCUMENTS

| | | | | |
|---|---|---|---|---|
| 6,317,716 | B1 * | 11/2001 | Braida et al. | 704/275 |
| 8,032,384 | B2 * | 10/2011 | Rylander | 704/277 |
| 8,488,847 | B2 | 7/2013 | Nozaki et al. | |
| 2002/0133340 | A1 * | 9/2002 | Basson et al. | 704/235 |
| 2002/0161582 | A1 * | 10/2002 | Basson et al. | 704/260 |
| 2007/0031010 | A1 * | 2/2007 | Sukegawa et al. | 382/118 |
| 2007/0126884 | A1 * | 6/2007 | Xu et al. | 348/220.1 |
| 2008/0240519 | A1 | 10/2008 | Nagamitsu | |
| 2009/0059037 | A1 * | 3/2009 | Naick et al. | 348/231.99 |
| 2011/0064281 | A1 * | 3/2011 | Chan | 382/118 |

FOREIGN PATENT DOCUMENTS

| | | |
|---|---|---|
| CN | 101276221 A | 10/2008 |
| CN | 101313565 A | 11/2008 |
| JP | 2005-107885 A | 4/2005 |

OTHER PUBLICATIONS

Office Action issued for CN 201010579410.8 (Apr. 11, 2014).

* cited by examiner

*Primary Examiner* — Hung Lam
(74) *Attorney, Agent, or Firm* — Drinker Biddle & Reath LLP

(57) ABSTRACT

Provided are a digital photographing apparatus and a method of controlling the digital photographing apparatus. The digital photographing apparatus includes an image generator configured to generate an image comprising a subject; a subject recognizer configured to recognize the subject from the generated image of the subject; a cue selector configured to select a cue for the recognized subject; and an output unit configured to output the selected cue. The recognized subject may be captured after the selected cue is output.

19 Claims, 5 Drawing Sheets

DIGITAL PHOTOGRAPHING APPARATUS AND METHOD OF CONTROLLING THE SAME

CROSS-REFERENCE TO RELATED PATENT APPLICATION

This application claims the benefit of Korean Patent Application No. 10-2009-0119905, filed on Dec. 4, 2009, in the Korean Intellectual Property Office, the entire disclosure of which is incorporated herein by reference.

BACKGROUND

1. Field of the Invention

Embodiments of the invention relate to a digital photographing apparatus and a method of controlling the same where a cue is presented to a subject.

2. Description of the Related Art

A user of a digital photographing apparatus may have difficulty capturing an image of a baby or an animal since the baby or animal may not understand that an image is being captured. The user may not be able to control or anticipate the behavior of the baby or the animal. Often, the user compensates by capturing many images of the baby or animal, which may require a lot of resources of the digital photographing apparatus and waste a lot of the user's time.

SUMMARY

Therefore there is a need in the art for a digital photographing apparatus including an image generator configured to generate an image comprising a subject; a subject recognizer configured to recognize the subject from the generated image of the subject; a cue selector configured to select a cue for the recognized subject; and an output unit configured to output the selected cue.

The image generator is configured to generate a live-view image comprising the subject, and the subject recognizer is configured to recognize the subject from the live-view image, and the image generator is configured to capture an image comprising the subject, if the output unit has output the selected cue and a signal to capture the subject is input.

The subject may be a face.

The cue selector may be configured to select a cue according to the recognized face.

The output unit may include a first display which is disposed in a side of the digital photographing apparatus facing the subject and is configured to display an image corresponding to the selected cue.

The output unit is further may be configured to display on the first display an animation if a face of a baby is recognized by the subject recognizer.

A second display which may be disposed in a rear side of the digital photographing apparatus facing a user and configured to display the generated image comprising the subject.

The cue selector may be configured to select an audio signal as the cue according to the recognized face, and the output unit comprises a speaker configured to output the audio signal.

The digital photographing apparatus may include an output signal generator configured to generate an output signal according to the selected cue, and wherein the output unit is configured to output the generated output signal.

The cue selector is further configured to select a cue based on a number of recognized subjects.

A method of controlling a digital photographing apparatus is disclosed. The method of controlling the digital photographing apparatus may include generating an image comprising a subject; recognizing the subject from the image; selecting a cue according to the recognized subject; and outputting the cue.

The step of generating the image may include generating a live-view image comprising the subject; and in response to receiving a signal to capture an image, generating a captured image comprising the subject after the selected cue has been output, wherein the subject is recognized from the live-view image.

The subject may be a face.

The step of selecting a cue further may include selecting a cue according to the recognized face.

The step of generating an image further may include generating an image comprising a subject on a second display which is disposed in a rear side of the digital photographing apparatus facing a user; and herein the step of selecting a cue further comprises: selecting a cue according to the recognized subject, and displaying the cue a first display which is disposed in a side of the digital photographing apparatus facing the subject.

The step selecting a cue further may include selecting an animation as the cue if a face of a baby is recognized as the subject.

The method may include displaying the generated image on the second display.

The step of selecting a cue according to the recognized subject may include selecting an audio signal as the cue for the recognized face.

The method may include generating an output signal according to the selected cue.

The method may include selecting a cue based on a number of recognized subjects.

The step outputting the cue may include outputting the cue; and capturing an image of the subject.

The step of recognizing further may include if a cue is not associated with the recognized subject in a database of cues, then prompting a user to select a cue to associate with the recognized subject.

Selecting a cue further may include selecting a cue according to the recognized subject and according to a user selected mood mode, the user selected mood mode comprising at least smile and serious.

BRIEF DESCRIPTION OF THE DRAWINGS

The above and other features and advantages of embodiments of the invention will become more apparent by describing in detail exemplary embodiments thereof with reference to the attached drawings in which.

DETAILED DESCRIPTION

Figure 1A:
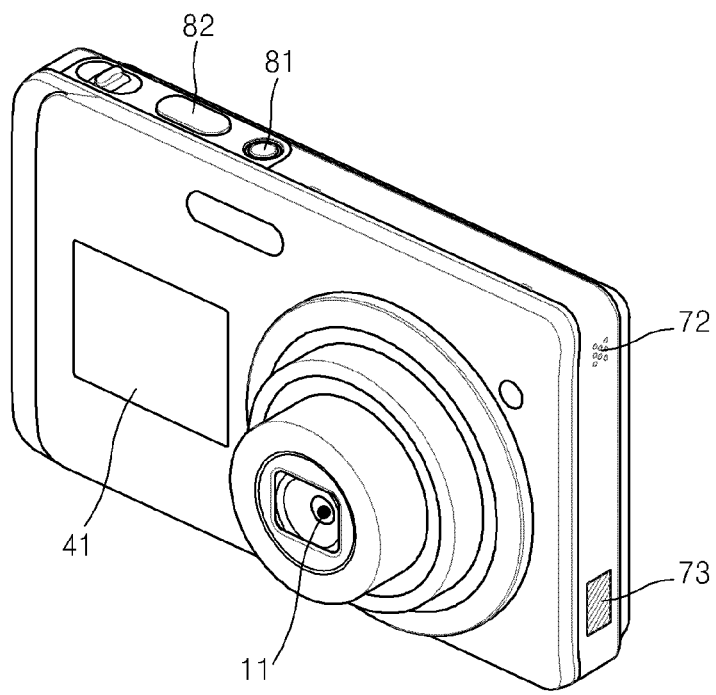
FIG. 1A illustrates a front side of a digital photographing apparatus according to an embodiment of the invention.
Figure 1B:
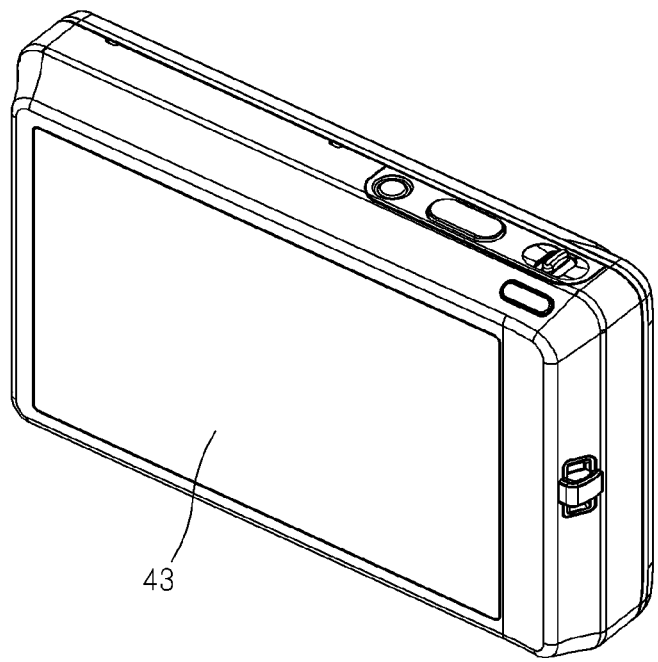
FIG. 1B illustrates a back side of the digital photographing apparatus of FIG. 1A.

FIG. 1A illustrates a front side of a digital photographing apparatus according to an embodiment of the invention, and FIG. 1B illustrates a back side of the digital photographing apparatus of FIG. 1A.

The current embodiment exemplifies a compact digital still camera as the digital photographing apparatus but the invention is not limited thereto. The digital photographing apparatus may be a digital device such as a video camera, a personal digital assistant (PDA), a television (TV), a digital picture frame, a cellular phone, a portable multimedia player (PMP), or a similar device.

Referring to FIG. 1A, a first display 41 is disposed in a front side of the compact digital still camera. A lens of an optical unit 11 protrudes from the front side of the compact digital still camera, and a power button 81 and a shutter-release button 82 are disposed on an upper side of the compact digital still camera. A microphone 72 and a speaker 73 are disposed on one of left and right sides.

Since the first display 41 is disposed in the front side facing a subject, the subject confirms an image displayed on the first display 41.

Referring to FIG. 1B, the compact digital still camera further includes a second display 43. The second display 43 displays a live-view image through which a user confirms the subject when capturing the subject.

The compact digital still camera will now be described in more detail with reference to FIG. 2.

Figure 2:
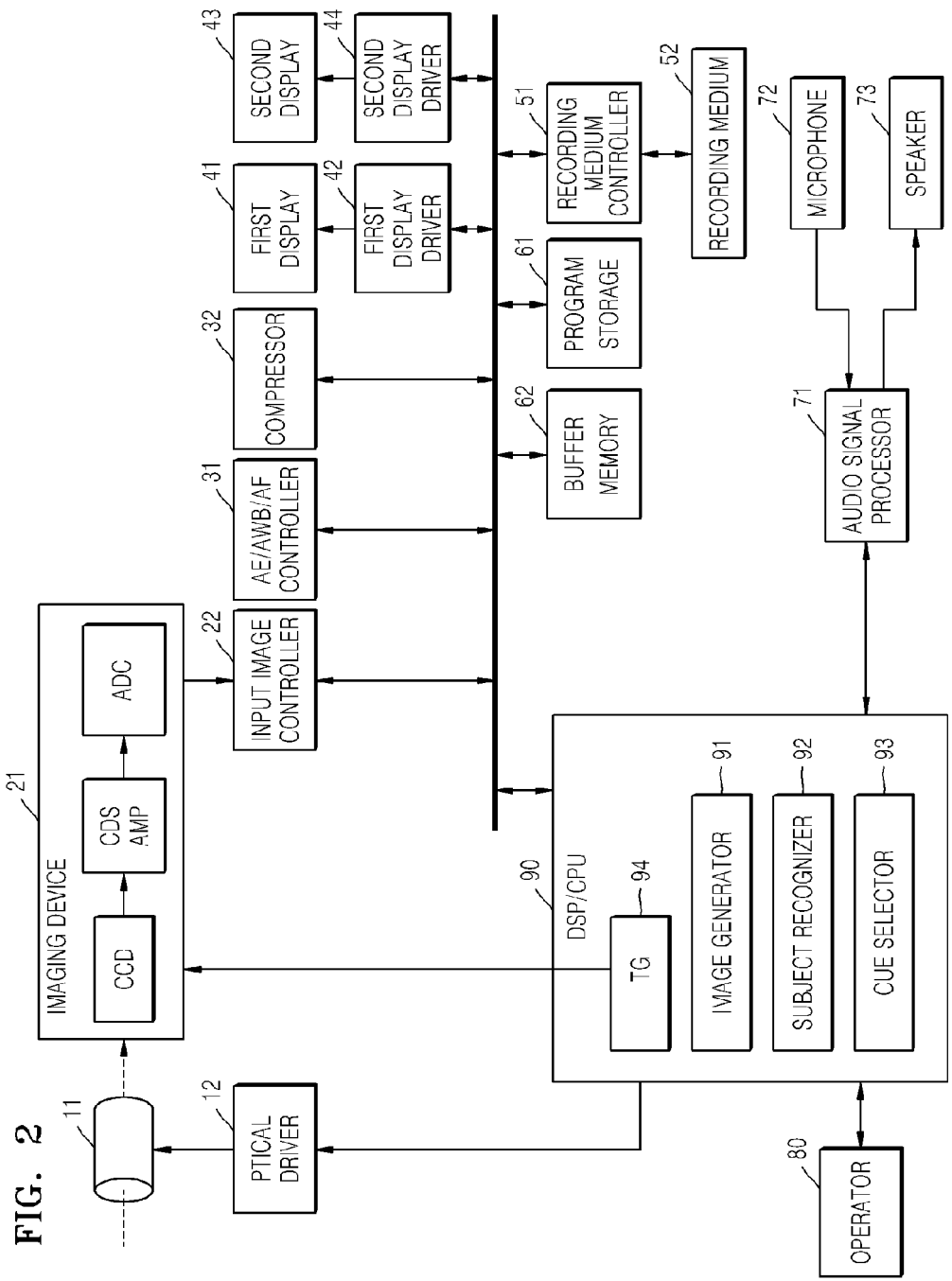
FIG. 2 is a block diagram of the digital photographing apparatus of FIG. 1.

Referring to FIG. 2, the compact digital still camera includes the optical unit 11, an imaging device 21, an input image controller 22, an auto exposure (AE)/auto white balance (AWB)/auto focus (AF) controller 31, a compressor 32, the first display 41 disposed in the front side of the compact digital still camera, the second display 43 disposed in the rear side of the compact digital still camera, a recording medium 52, a program storage 61, a buffer memory 62, the microphone 72, the speaker 73, an operator 80, and a digital signal processor (DSP)/central processing unit (CPU) 90.

The optical unit 11 includes a lens which condenses an optical signal, an aperture which adjusts an amount of the optical signal (an amount of light), and a shutter which controls an input of the optical signal. The lens may include a zoom lens which narrows or widens a view angle according to a focal length, and a focus lens which adjusts a focus of the subject. These lenses may be formed into a single lens but may be classified into groups each including a plurality of lenses. The shutter may be a mechanical shutter which moves a cover up and down. Alternatively, instead of separately installing the shutter, a supply of electrical signal to the imaging device 21 may be controlled so that the imaging device 21 performs a function of the shutter.

An optical driver 12 drives the optical unit 11 and adjusts a position of the lens, opening and/or closing of the aperture, an operation of the shutter, and the like in order to perform operations such as adjusting of AF, AE, and the aperture, zooming, changing of the focus, and the like. The optical driver 12 receives a control signal from the DSP/CPU 90 and drives the optical unit 11 according to the control signal.

The imaging device 21 includes a Charged Coupled Device (CCD) as a photoelectric conversion device which receives the optical signal through the optical unit 11 and converts the optical signal into the electrical signal. The embodiment exemplifies a CCD sensor array as an imaging device but is not limited thereto. A Complementary Metal Oxide Semiconductor (CMOS) sensor array may be used as the imaging device.

The imaging device 21 includes a correlated double sampling (CDS)/amplifier (AMP) and an analog-to-digital converter (ADC). The CDS/AMP removes low frequency noise from the electrical signal output from the CCD and amplifies the electrical signal to a predetermined level. The ADC converts the electrical signal output from the CDS/AMP into a digital signal. The ADC outputs the digital signal to the image input controller 22.

The imaging device 21 is controlled by a timing signal output from the DSP/CPU 90. A timing generator (TG) 94 outputs the timing signal to the imaging device 21 in order to control an exposure time of each of pixels constituting the CCD or control reading of charge. Therefore, the imaging device 21 provides image data corresponding to an image of a frame according to the timing signal output from the TG 94.

The AE/AWB/AF controller 31 calculates an AE evaluation value based on the image data input into the compact digital still camera and calculates a size of the aperture or a speed of the shutter based on the AE evaluation value. Exposure is controlled by exposure time, gain, and a read mode of the imaging device 21. The gain is used to calculate a contrast value. The read mode of the imaging device 21 refers to a signal processing mode necessary for reading the image data and in which a pixel is added when an image of the subject is dark or all of pixels are read when the image of the subject is light. Gain of three primary colors is calculated based on the AWB evaluation value calculated based on the image data in order to control an AWB. A position of the focus of the focus lens is calculated based on an AF evaluation value in order to control an AF. The AF evaluation value is calculated based on a luminance value of the image data. For example, according to a method of detecting the contrast value, the AF evaluation value is a contrast value of an image signal. Thus, when the contrast value reaches a peak, it is determined that the image of the subject is focused on an imaging surface of the imaging device 21. The AE/AWB/AF controller 31 receives a focus control start operating signal, generates a control signal for moving the focus lens in one direction, and outputs the control signal to a focus lens driver. The control of the AF may include first driving of the focus lens for determining a main subject image and second driving of the focus lens for driving one range including a peak value of a contrast value corresponding to the main subject image to detect the position of the focus. The AE/AWB/AF controller 31 outputs the position of the focus that has been obtained by controlling the AF, as a control signal to the focus lens driver. The focus lens driver generates a driving signal based on the control signal output from the AE/AWB/AF controller 31 and drives the focus lens according to the driving signal.

The compressor 32 receives the image signal that has not been compressed and compresses the image signal in a compression format such as a Joint Photographic Experts Group (JPEG) compression format, a Lempel-Ziv-Welch (LZW) compression format, or the like. The compressor 32 transmits the compressed image data to the recording medium 52 to store the compressed image data.

A first display driver 42 drives the first display 41 to display an image corresponding to image data that has been generated through various types of setup screens or by capturing. A second display driver 44 drives the second display 43 to display an image that has been generated through various types of screens or by capturing. The image data is an image recorded in the recording medium 52 or is provided from the buffer memory 62 in real time. The first and second displays 41 and 43 may be display devices such as liquid crystal displays (LCDs), organic light-emitting displays (OLEDs), plasma display panels (PDPs), or EDDs.

The first display 41 is embedded in the front side of the compact digital still camera, and the second display 43 is embedded in the rear side opposite to the front side. Since the first display 41 is disposed in the front side facing the subject, the first display 41 displays an image for changing an atmosphere of the subject. Thus, the subject focuses on the compact digital still camera. In particular, if the subject is an animal or a baby, the first display 41 helps the subject to look at the compact digital still camera so as to obtain a desired image of the subject. This function of the first display 41 will be described in more detail later along with the DSP/CPU 90. Since the second display 43 is disposed in the rear side facing the user, the second display 43 displays the live-view image so that the user confirms the image of the subject in real time. If the image of the subject is an image that the user desires to obtain, the user presses the shutter-release button 82 to capture the desired image of the subject.

A recording medium controller 51 writes the image data to the recording medium 52 or reads the image data or setup information from the recording medium 52. The recording medium 52 may be an optical disc (e.g., a compact disc, a digital versatile disc, a blu-ray disc, or similar device), a magneto-optical disc, a magnetic disc, a semiconductor memory, or similar device and records captured image data. The recording medium controller 51 and the recording medium 52 may be attached to and/or detached from the compact digital still camera.

The program storage 61 stores an operating system for operating the compact digital still camera, an application program, and similar applications. The program storage 61 may be an Electrically Erasable Programmable Read-Only Memory (E2PROM), a flash memory, a Read Only Memory (ROM), or similar device.

The buffer memory 62 temporarily stores the image data of the captured image. The buffer memory 62 may store image data of several images and stores image signals for controlling the focus in order to output an image signal. An image input controller 22 controls writing and reading of the image with respect to the buffer memory 62. The buffer memory 62 may include an image display memory having several channels. The buffer memory 62 inputs the image data for displaying the image and simultaneously outputs the image data to the first and second display drivers 42 and 44. Resolution or the maximum number of colors of the second display 43 depends on capacity of the image display memory.

An audio signal processor 71 converts an analog audio signal input through the microphone 72 into a digital audio signal and transmits the digital audio signal to the DSP/CPU 90. The audio signal processor 71 converts the digital audio signal output from the DSP/CPU 90 into an analog audio signal and outputs the analog audio signal to the speaker 73. According to the embodiment, the audio signal processor 71 may provide an audio signal for changing an atmosphere of the subject under specific conditions determined by the DSP/CPU 90 and output the audio signal to the speaker 73. This operation of the audio signal processor 71 will be described in more detail later along with the DSP/CPU 90.

The operator 80 is an element which operates the compact digital still camera or executes various types of setups during capturing. For example, the operator 80 may be realized as a button, a key, a touch panel, a touch screen, a dial, or the like. The operator 80 may input a user operation signal for turning the compact digital still camera on and/off, starting and/or stopping capturing, starting, stopping, and/or searching playing, driving an optical system, transforming a mode, operating a menu, performing a selection operation, or the like. For example, the shutter may be half-pressed, full-pressed, or unpressed by the user. When the shutter is half-pressed (operation "S1"), the shutter outputs the focus control start operating signal and is released from being half-pressed so as to end controlling of the focus. When the shutter is full-pressed (operation "S2"), the shutter outputs a capturing start operating signal. The focus control start operating signal and the capturing start operating signal are transmitted to the DSP/CPU 90 to drive corresponding elements according to the focus control start operating signal and the capturing start operating signal.

The DSP/CPU 90 is an operation processing device and/or control device for performing an operation and a control using a program and controls processing of elements installed in the compact digital still camera. The DSP/CPU 90 outputs the control signal to the optical driver 12 and drives the optical unit 11 based on the focus control or the exposure control. The DSP/CPU 90 controls elements of the compact digital still camera based on a signal output from the operator 80. In embodiments, the DSP/CPU 90 may include a plurality of CPUs which respectively execute a signal-based command and an operation-based command.

The DSP/CPU 90 includes an image generator 91 which generates the image including the subject and a subject recognizer 92 which recognizes the subject. The DSP/CPU 90 further includes an cue selector 93 which selects a cue according to the recognized subject and may generate an output signal of the selected cue. The output signal of the cue may be output through an output unit. If the output signal of the cue is an image, the image is output through the first display 41. If the output signal of the cue is an audio signal, the audio signal is output through the speaker 73.

The image generator 91 reduces noise from the input image data and performs image signal processing, such as gamma correction, color filter array interpolation, color matrix, color correction, color enhancement, or the like, on the input image data. The image generator 91 performs the image signal processing on image data input by capturing a subject and generates an image including the subject.

If the subject is a face, the image generator 91 generates an image including the face in a live-view mode, and the subject recognizer 92 recognizes the face from the image using a face recognition algorithm. The cue selector 93 selects a cue and may generate an output signal corresponding to the recognized face. For example, if the recognized face is a face of a baby, the cue selected may be an animation and the output signal of the cue may be an output signal of the animation image such as a character image, or the like for capturing the attention of a baby. If the face of the baby is recognized after a database (DB) of the image of the face is pre-stored, the animation image or the character image may be selected as the cue from the database and an output signal generated of the animation. The animation image or the character image of the cue may be output through the first display 41 disposed in the front side of the compact digital still camera facing the baby that is the subject. In other words, the cue which may be an animation image or a character image may be displayed on the first display 41. Therefore, the baby looks at the compact digital still camera because of the displayed cue, and which enables the user to capture an image of the baby where the baby is looking at the digital image apparatus and may be even smiling or looking attentive. If the baby looks at the compact digital still camera because of the cue, the user may press the shutter-release button 82 to capture an image of the attentive baby. Here, the image generator 91 generates a captured image.

The cue selector 93 may select an audio signal according to the recognized face and generate an output signal. For example, if the face of the baby is recognized, the cue selector 93 may select and generate an audio signal such as a children's song for changing the mood of the baby and/or to get the baby's attention. The audio signals may be pre-stored as a DB to enable the cue selector 93 to select an appropriate audio signal for the recognized face or image. The audio signal is output through the speaker 73. A cue may be a sound, a song, an image, or an animation. The cue is selected and is retrieved from the database.

The cue selector 93 selects a cue corresponding to the subject recognized by the subject recognizer 92. The cue may be input by a manipulation of the user or may be automatically set and stored to correspond to the recognized subject. The cue selector 94 may set the cue according to the number of recognized subjects. For example, the cue selector 93 may count the number of recognized subjects as in Table 1 below and sets the cue according to the number of counts. Thus, if the recognized subjects include a subject that has been frequently captured, the cue selector 93 may select a cue indicating that the subject is frequently captured. This may make capturing images more interesting.

TABLE 1

| The number of recognized subjects | 1 | 2 | 3 | 4 |
|---|---|---|---|---|
| Audio output signal | sound 1 | sound 2 | sound 3 | sound 4 |

Figure 3:
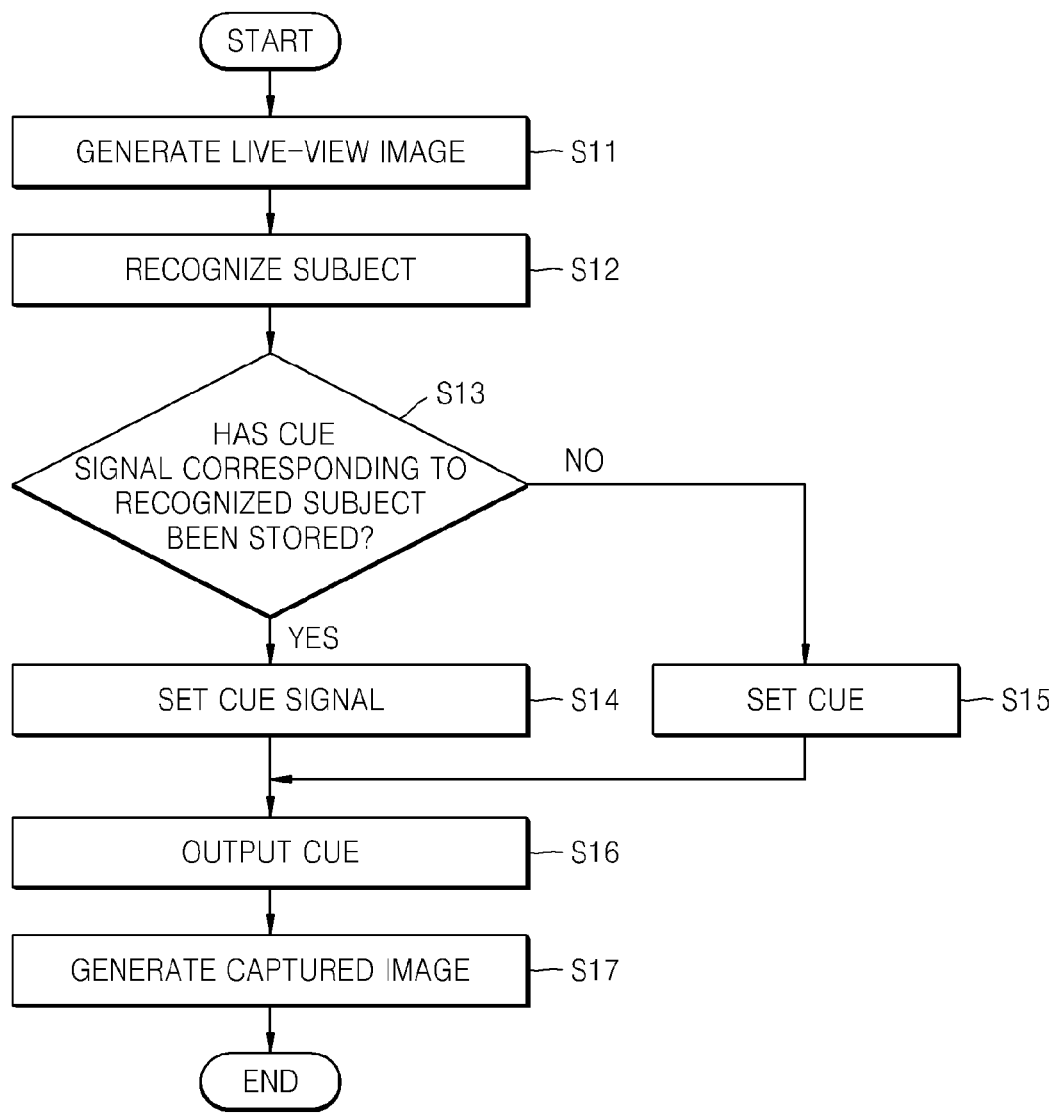
FIG. 3 is a flowchart of a method of controlling a digital photographing apparatus according to an embodiment of the invention.

FIG. 3 is a flowchart of a method of controlling a digital photographing apparatus according to an embodiment of the invention. Referring to FIG. 3, in operation S11, a live-view image is generated in a capturing mode. The live-view image is displayed through a second display which is embedded in a rear side of the digital photographing apparatus facing a user.

In operation S12, a subject is recognized from the live-view image. If the subject is a face, the subject is recognized using a face recognition method. In particular, if the subject is a face of a baby, the subject is recognized using characteristic data that indicates the face is of a baby.

In operation S13, a determination is made as to whether a cue corresponding to the recognized subject has been stored.

Figure 4:
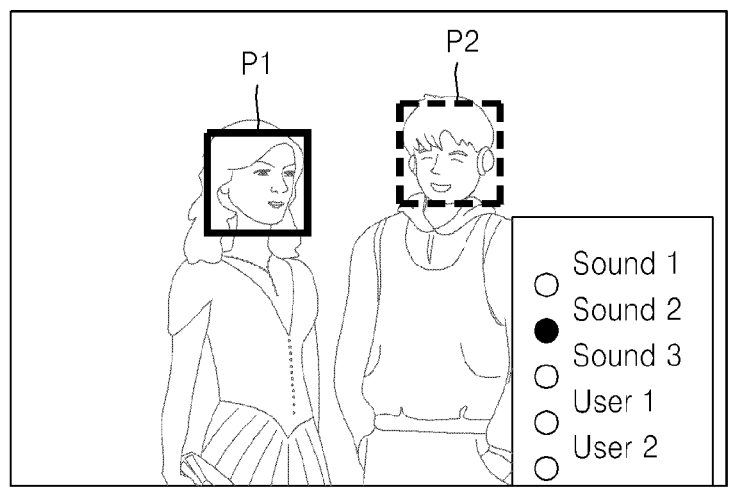
FIG. 4 illustrates a process of setting an audio signal corresponding to a recognized subject, according to an embodiment of the invention.

If it is determined in operation S13 that the cue has not been stored, a cue is set in operation S15. In embodiments, the cue selector 93 may automatically select a default cue. If an audio signal is set to the cue, the audio signal will now be described with reference to FIG. 4. The live-view image includes a first subject "P1" and a second subject "P2." The first and second subjects "P1" and "P2" are persons, and faces of the first and second subjects "P1" and "2" are recognized using a face recognition method. A determination is made as to whether a cue corresponding to the recognized faces has been set. If it is determined that the cue has not been set, a cue is set. If an cue corresponding to the first subject "P1" is not set, cues are displayed on a right bottom of a screen, and one of the cues is selected as and set to the cue corresponding to the first subject "P1." A second sound "Sound 2" may be set to the cue corresponding to the first subject "P1."

If it is determined in operation S13 that the cue has been stored, the cue is generated in operation S16.

The cue is output through an output unit. If the cue is audio, the audio is output through a speaker. If the cue is an image, the cue is displayed on a display. In particular, if the cue is the image, the cue may change the mood of the subject and is displayed on a first display disposed in a front side of a digital still camera facing the subject. Thus, the subject may focus on the digital still camera by looking at the cue displayed on the first display.

If a capturing signal is input after the cue is output, an image of the subject is captured to generate a captured image in operation S17. Thus, a desired subject image is obtained where the subject may be focused on the digital still camera.

If a smile mode is selected by the user, the cue selector 93 may select a comic image making the subject smile which may enable the user to capture an image of the subject smiling. For example, the cue may be an animation of a popular cartoon creature that performs a funny act. If a serious mode is selected by the user, the cue selector 93 may select a serious image making the subject concentrate without smiling. The animation may include sound so that both an animation and sound are played as the cue.

Figure 5:
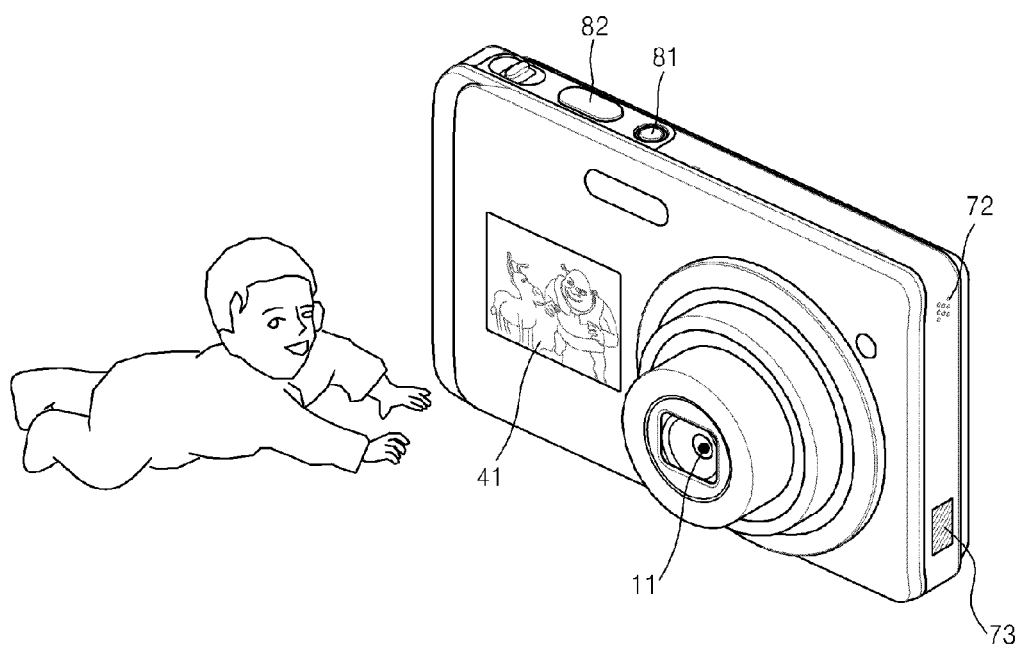
FIG. 5 illustrates a process of displaying an image corresponding to a recognized subject in a baby capturing mode, according to an embodiment of the invention.

FIG. 5 illustrates a process of displaying an image corresponding to a recognized subject in a baby capturing mode, according to an embodiment of the invention. Referring to FIG. 5, a first display 41 is disposed in a front side of a digital camera facing a baby subject. The digital camera recognizes the baby subject using a face recognition method when performing capturing, reads an animation or a character image as a cue corresponding to the recognized baby subject, and displays the animation or the character image on the first display 41. Thus, since the baby subject looks at the image displayed on the first display 41, the baby subject focuses on the digital camera. A user can then capture an image of the baby subject looking at the digital camera.

The digital camera outputs an audio signal, such as a voice of a character or the like, as a cue corresponding to the recognized baby subject through the speaker 73.

As described above, in a digital photographing apparatus and a method of controlling the digital photographing apparatus according to the invention, a subject is recognized. An cue such as an image or audio corresponding to the recognized subject is read to change an mood and/or attention of the subject. Thus, the digital photographing apparatus helps the subject to focus on capturing so that a user obtains a desired image.

In particular, when a baby or an animal that does not recognize that the user is attempting to capture an image, by using a dual display device including displays respectively disposed in front and rear sides of the digital photographing apparatus, an image of the recognized baby or animal is displayed on the display disposed in the front side facing the subject so that the subject looks at the digital photographing apparatus. Thus, a desired baby image or animal image is obtained.

The functionality associated with describing embodiments of the invention is described with a number of illustrative units. However, the units may be differently arranged so that the functionality of a single unit may be implemented with two or more units and the functionality of two or more units may be combined into a single unit. Moreover, the functionality may be differently arranged between illustrative units.

The various illustrative units, logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of instructions on a machine readable medium and/or computer readable medium.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. A digital photographing apparatus comprising:
    an image generator unit configured to generate an image comprising a subject, which is a face, based on image light received from the subject by an imaging device;
    a subject recognizer unit implemented in a computer-based processing unit that is programmed to automatically recognize the subject from the generated image of the subject using a face recognition algorithm;
    a cue selector unit in the computer-based processing unit that is:
    programmed to search a database containing a plurality of pre-stored cues that are associated with a corresponding plurality of pre-stored subjects to automatically select a cue according to the recognized subject; and
    an output unit configured to output the selected cue,
    wherein the output unit comprises a first display which is disposed in a side of the digital photographing apparatus facing the subject and is configured to display an image corresponding to the selected cue.

2. The digital photographing apparatus of claim 1, wherein the image generator is configured to generate a live-view image comprising the subject, and the subject recognizer is configured to recognize the subject from the live-view image, and the image generator is configured to capture an image comprising the subject, if the output unit has output the selected cue and a signal to capture the subject is input.

3. The digital photographing apparatus of claim 1, wherein the output unit is further configured to display on the first display an animation if a face of a baby is recognized by the subject recognizer.

4. The digital photographing apparatus of claim 1, further comprising a second display which is disposed in a rear side of the digital photographing apparatus facing a user and configured to display the generated image comprising the subject.

5. The digital photographing apparatus of claim 1, wherein the cue selector is configured to select an audio signal as the cue according to the recognized face, and the output unit comprises a speaker configured to output the audio signal.

6. The digital photographing apparatus of claim 1, further comprising an output signal generator configured to generate an output signal according to the selected cue, and wherein the output unit is configured to output the generated output signal.

7. The digital photographing apparatus of claim 1, wherein the cue selector is further configured to select a cue based on a number of recognized subjects.

8. A method of controlling a digital photographing apparatus, comprising:
    generating an image comprising a subject based on image light received from the subject by an imaging device on a second display which is disposed in a rear side of the digital photographing apparatus facing a user;
    automatically recognizing the subject from the image using a computer-based processing unit and running a face recognition algorithm;
    automatically searching a database containing a plurality of pre-stored cues that are associated with a corresponding plurality of pre-stored subjects to select, using the computer-based processing unit, a cue associated with the recognized subject; and
    output the selected cue on a first display which is disposed in a side of the digital photographing apparatus facing the subject.

9. The method of claim 8, wherein the step of generating the image comprising the subject comprises:
    generating a live-view image comprising the subject; and
    in response to receiving a signal to capture an image, generating a captured image comprising the subject after the selected cue has been output,
    wherein the subject is recognized from the live-view image.

10. The method of claim 9, wherein the subject is a face.

11. The method of claim 10, wherein the step of selecting a cue further comprises selecting a cue according to the recognized face.

12. The method of claim 11, further comprising displaying the generated image on the second display.

13. The method of claim 8, wherein the step selecting a cue further comprises:
    selecting an animation as the cue if a face of a baby is recognized as the subject.

14. The method of claim 8, wherein the step of selecting a cue according to the recognized subject further comprises selecting an audio signal as the cue for the recognized face.

15. The method of claim 8, further comprising generating an output signal according to the selected cue.

16. The method of claim 8, further comprising selecting a cue based on a number of recognized subjects.

17. The method of claim 8, wherein the step outputting the cue further comprises:
    outputting the cue; and
    capturing an image of the subject.

18. The method of claim 8, wherein the step of recognizing further comprises:
    if a cue is not associated with the recognized subject in a database of cues, then prompting a user to select a cue to associate with the recognized subject.

19. The method of claim 8, wherein selecting a cue further comprises:
   selecting a cue according to the recognized subject and according to a user selected mood mode, the user selected mood mode comprising at least smile and serious.

* * * * *